(12) United States Patent
Nguyen-Tuong et al.

(10) Patent No.: US 10,393,625 B2
(45) Date of Patent: Aug. 27, 2019

(54) METHOD AND DEVICE FOR GENERATING ALLOWED INPUT DATA TRAJECTORIES FOR A TESTING SYSTEM

(71) Applicant: Robert Bosch GmbH, Stuttgart (DE)

(72) Inventors: The Duy Nguyen-Tuong, Leonberg (DE); Volker Imhof, Kornwestheim (DE); Ernst Kloppenburg, Ditzingen (DE); Bastian Bischoff, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 992 days.

(21) Appl. No.: 14/250,121

(22) Filed: Apr. 10, 2014

(65) Prior Publication Data

US 2014/0309948 A1 Oct. 16, 2014

(30) Foreign Application Priority Data

Apr. 10, 2013 (DE) .................. 10 2013 206 258

(51) Int. Cl.
*G01M 15/02* (2006.01)
*G01D 3/028* (2006.01)
*G01D 1/14* (2006.01)

(52) U.S. Cl.
CPC .............. *G01M 15/02* (2013.01); *G01D 1/14* (2013.01); *G01D 3/028* (2013.01)

(58) Field of Classification Search
CPC ........... G01M 15/02; G01D 1/14; G01D 3/02; G01D 3/028; G01D 21/00; G05B 23/00
See application file for complete search history.

(56) References Cited

U.S. PATENT DOCUMENTS 7,628,146 B2 * 12/2009 Kloppenburg ...... F02D 41/2422
123/486

* cited by examiner

*Primary Examiner* — Leslie J Evanisko
(74) *Attorney, Agent, or Firm* — Norton Rose Fulbright US LLP; Gerard Messina (57) ABSTRACT

A method for generating an allowed input data trajectory for a physical system to be tested or measured, including providing an input data trajectory in an input data space; determining an allowed operating range; and replacing at least one segment of the provided input data trajectory, which is outside of the allowed operating range, by a trajectory segment within the allowed operating range, in order to obtain the allowed input data trajectory.

12 Claims, 5 Drawing Sheets

METHOD AND DEVICE FOR GENERATING ALLOWED INPUT DATA TRAJECTORIES FOR A TESTING SYSTEM

CROSS REFERENCE

The present application claims the benefit under 35 U.S.C. § 119 of German Patent Application No. DE 10 2013 206 258.3 filed on Apr. 10, 2013, which is expressly incorporated herein by reference in its entirety.

FIELD

The present invention relates to a method and a device for generating input data, in particular input data for a testing system for measuring or testing a physical system to be tested, such as an engine system having an internal combustion engine.

BACKGROUND INFORMATION

When a physical system is tested, such as an engine system having an internal combustion engine, measuring points must be predefined as input data, which are present in the desired input data space filling as much space as possible. The space filling property of the input data means that within one input data space, the measuring points of the input data are distributed as uniformly as possible across the entire input data space.

Furthermore, the trajectories connecting the measuring points should be dynamically filling, i.e., provide different dynamic excitations for a measuring point or an operating range defined by measuring points which are in close proximity to one another.

When measuring points for the input data are prepared, a trajectory is normally ascertained using known methods, which are run at varying speeds in order to provide different dynamic operating points. However, during a dynamic excitation, it is more difficult to ensure that the measuring points of the input data are exclusively located within a feasible or allowed input data range with regard to the physical system to be measured or tested. Compliance with the allowed input data range for the measuring points is even more important for dynamic test runs, since the application of measuring points outside an allowed input data range is more likely to result in damage to the physical system to be measured. It may thus be important to provide input data for a dynamic excitation of a physical system, in which damage to the physical system to be measured may be avoided.

SUMMARY

According to the present invention, an example method for generating allowed input data trajectories for a physical system to be tested or measured is provided, and an example device and computer program are provided.

According to a first aspect, a method for generating an allowed input data trajectory for a physical system to be tested or measured is provided, which includes the following steps:
  providing an input data trajectory in an input data space;
  determining an allowed operating range; and
  replacing at least one segment of the input data trajectory, which is outside of the allowed operating range, by a trajectory within the allowed operating range, in order to obtain the allowed input data trajectory.

According to the above-described method for generating an allowed input data trajectory for a physical system, the method limits, changes, or maps a provided input data trajectory, which corresponds to a curve of input values combinations having correspondingly assigned dynamic excitations, to an allowed input data trajectory within a predefined allowed operating range, without losing the different dynamic excitations caused by the provided input data trajectory. This makes it possible to preserve the dynamic excitations within the predefined allowed operating range and simultaneously ensure that no unallowed input values combinations are provided as measuring points outside the predefined allowed operating range.

This may be achieved in particular in that the limitation of the input data range is predefined by the allowed operating range, and measuring points of the input data or the provided input data trajectory are transformed or changed in such a way that it extends completely within the limitation of the allowed operating range. The limitation of the input data trajectory to the allowed operating range makes it possible to avoid possible damage to the physical system to be tested due to dynamic excitations outside the allowed input data space.

Furthermore, the provided input data trajectory may be formed by a sequential application of combinations of input values of input variables, which are in particular uniformly distributed within an input data space.

According to one specific embodiment, the allowed operating range may be determined as a convex envelope around the allowed input values combinations.

It may be provided that the allowed input values combinations are determined, in that the input values combinations are recognized as allowed by an application taking place in a stationary measurement of input values combinations selected from the input data space, a stable operating point of the physical system being assumed in the input values combinations.

Furthermore, the segment of the input data trajectory, which is outside of the allowed operating range, may be replaced by a trajectory segment of a first edge-input values combination as a first point of intersection of the input data trajectory with the edge of the allowed operating range to a provided target within the allowed operating range, in particular to a center point of the allowed operating range, and of the provided target, in particular the center point, to a second edge-input values combination as a second point of intersection of the input data trajectory with the edge of the allowed operating point. In this way, an allowed input data trajectory within the allowed operating range is obtained without limitations of the dynamic excitation.

According to one first specific embodiment, it may be provided that the first edge-input values combination and the second edge-input values combination are adjacent to one another on the edge of the allowed operating range, or are determined by two consecutive points of intersection of the input data trajectory with the edge of the allowed operating range.

Furthermore, the input data trajectory may be transformed into the allowed operating range, in that the distances of the input values combinations on the input data trajectory are reduced from a provided target in the allowed operating range, in particular the center point of the allowed operating range, in conformity with a particular scaling factor.

It may be provided that the scaling factor for an input values combination is ascertained as a ratio of the distance between the point of intersection of the connecting straight line with the edge of the allowed operating range and the provided target, in particular the center point of the allowed operating range, to the distance between the point of intersection of a connecting straight line elongated to the edge of the input data space with the edge of the input data space and the center point of the allowed operating range.

According to another aspect, an example device is provided, in particular an arithmetic unit, for generating an allowed input data trajectory for a physical system to be tested or measured, the device being designed in order to:
provide an input data trajectory in an input data space;
determine an allowed operating range; and
replace at least one segment of the provided input data trajectory, which is outside of the allowed operating range, by a trajectory within the allowed operating range, in order to obtain the allowed input data trajectory.

According to another aspect, an example computer program is provided which is designed for executing all steps of the above-described method.

The present invention also relates to a computer-readable storage medium storing a computer program designed to generate an allowed input data trajectory for a physical system to be tested or measured, the computer program, when executed by a computer, causing the computer to perform the steps of: providing an input data trajectory in an input data space; determining an allowed operating range; and replacing at least one segment of the provided input data trajectory, which is outside of the allowed operating range, by a trajectory segment within the allowed operating range to obtain the allowed input data trajectory.

The present invention further relates to an electronic storage medium storing a computer program designed to generate an allowed input data trajectory for a physical system to be tested or measured, the electronic storage medium, when executed by a computer, causing the electronic storage medium to perform the steps of: providing an input data trajectory in an input data space; determining an allowed operating range; and replacing at least one segment of the provided input data trajectory, which is outside of the allowed operating range, by a trajectory segment within the allowed operating range to obtain the allowed input data trajectory. The present invention also relates to an electronic control unit which has an electronic storage medium, the electronic storage medium storing a computer program designed to generate an allowed input data trajectory for a physical system to be tested or measured, the electronic storage medium, when executed by a computer, causing the electronic storage medium to perform the steps of: providing an input data trajectory in an input data space; determining an allowed operating range; and replacing at least one segment of the provided input data trajectory, which is outside of the allowed operating range, by a trajectory segment within the allowed operating range to obtain the allowed input data trajectory.

BRIEF DESCRIPTION OF THE DRAWINGS

Preferred specific embodiments of the present invention are explained in greater detail below with reference to the figures.

DETAILED DESCRIPTION OF EXAMPLE EMBODIMENTS

Figure 1:
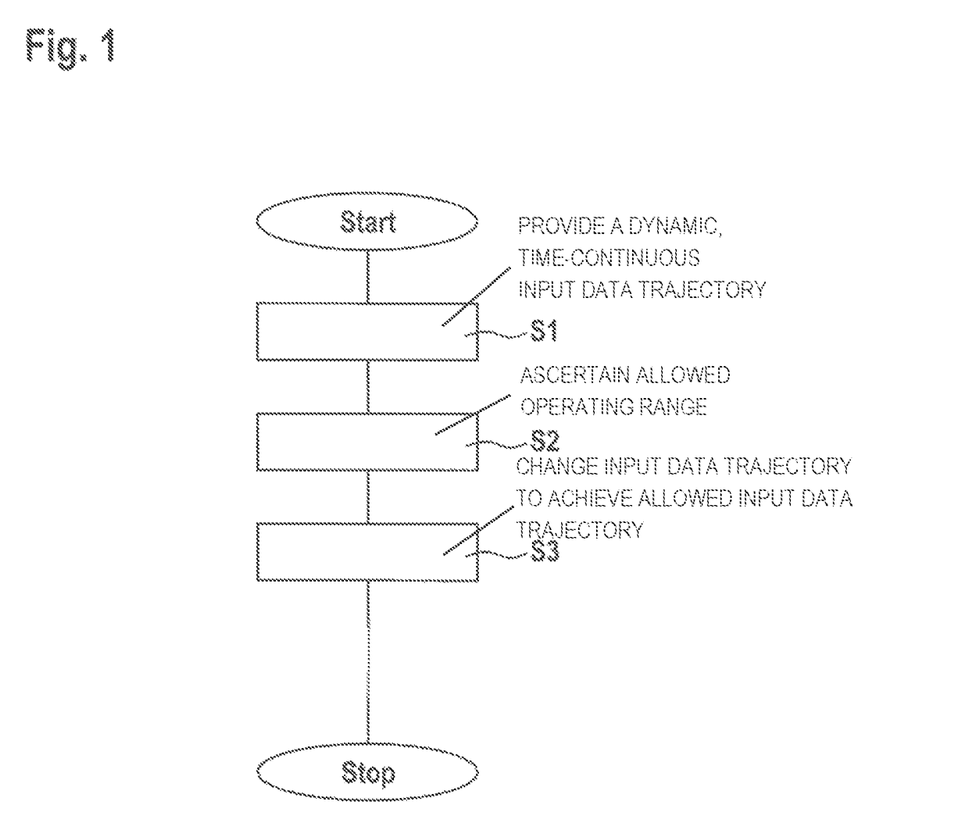
FIG. 1 shows a flow chart for illustrating an example method for generating input data for a test system.

A flow chart for illustrating the method for generating input data for a test system is shown in FIG. 1. The method starts at step S1, in which a dynamic, time-continuous input data trajectory is provided. The input data trajectory is generated within an input data space whose dimensions correspond to the number of input variables. The input data trajectory is made up of a sequence of combinations of input values of input variables, which are started one after the other at a certain rate in order to thus obtain a dynamic excitation at different operating points. The individual input variables of the input data space are provided with input values ranges, which, when considered across all operating points, include at least the occurring input variable values.

Due to the simpler presentation, two input variables are assumed for a physical system to be tested or measured in the present exemplary embodiment. The physical system to be tested or measured is represented by taking an internal combustion engine as an example using the input variables of a relative quantity of air RL and a speed D. Although it is not possible to set the speed directly, it may nonetheless be considered as an input variable, which may be predefined with the aid of other variables, for example, camshaft angle, quantity of fuel injected and the like, in an internal combustion engine.

The input data may be generated automatically, e.g., by providing the input variables as (asynchronous) chirp signals of different periodicity or by providing the input variables as ramp signals representing in particular linear ramps of different slope and amplitude. The combination results in an input data trajectory that is space-filling and provides various dynamic excitations for the combinations of input values or for the operating ranges defined by closely spaced measuring points.

The input data trajectory is thus generated as a transition between measuring points, which are formed as combinations of input variables ranges of the input variables which are distributed across their entire input values ranges in a space-filling manner, so that they cause different dynamic excitations of the physical system. However, due to the dynamic excitation, there is the risk of damage to the physical system, if the operating point defined by the combination of the input variables values is outside an allowed operating range.

Figure 2A:
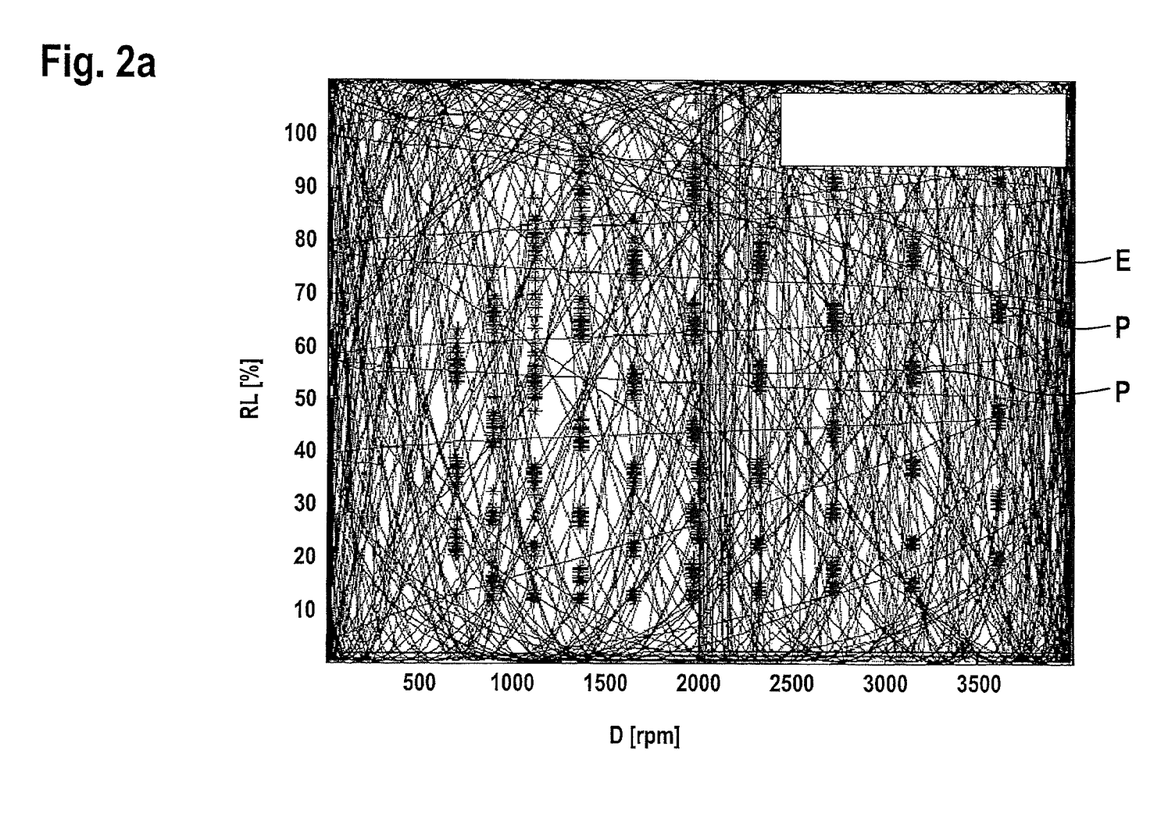
FIGS. 2*a* and 2*b* show an illustration of a dynamic trajectory for two input variables—speed and relative quantity of air of an internal combustion engine—as well as a convex envelope for limiting the input data space.

Therefore, an allowed operating range for the input data generated in step S1 is ascertained in step S2. The allowed operating range may be ascertained by attempting to set stationary input values combinations within the input data space. This makes it possible to detect whether the input values combinations are achievable by the physical system and are stable there, i.e., maintained without additional interventions. For the internal combustion engine, this means that the operating point defined by the input values combination may be kept stable, in particular established based on a constant speed without additional interventions. This is, for example, illustrated in FIG. 2*a* by the represented points. Apparent are measuring points P defined within the input data space by the input values combinations which are assumed to be stationary (applied), as well as areas in which no measuring points which may be applied in a stationary manner are present, i.e., input values combinations which were not able to be set. The provided input data trajectory is denoted as E.

Figure 2B:
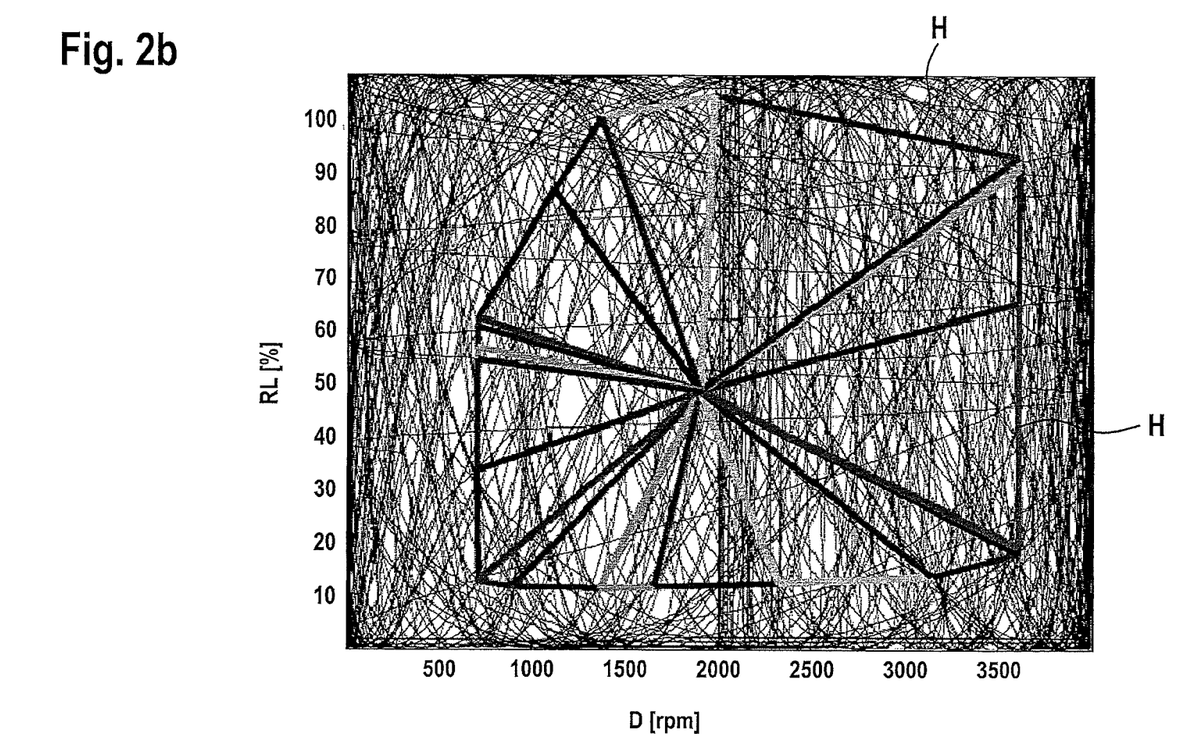

From the obtained feasible or allowed static measuring points, a convex envelope H, which defines the allowed operating range, may be calculated now in a conventional manner. For the above example, convex envelope H is shown in FIG. 2b.

With the aid of convex envelope H, which defines the allowed operating range, it is now possible to detect which parts of the input data trajectory or which of the input variable combinations generated in step S1 are within or outside the allowed operating range. To avoid the above-described undesirable dynamic operating conditions outside of the allowed operating range, the segments of the input data trajectory outside the allowed operating range should be avoided in the test system.

It is thus provided in step S3 to change the input data trajectory in such a way that an allowed input data trajectory is achieved, which runs only within the allowed operating range.

The transformation may be carried out using different methods.

According to a first method, a center point is initially calculated as a mean value of the input values combinations on the edge of the area enclosed by convex envelope H and/or on the convex envelope. In the above example, the mean value corresponds to an operating point at approximately 2,000 revolutions per minute and 50% relative air quantity. Furthermore, the segments of the input data trajectory, in particular the corresponding input values combinations, outside the allowed operating range are discarded and edge input values combinations are determined as points of intersection of the input data trajectory with convex envelope H.

The assigned edge input values combinations are replaced by new trajectory segments, which run in a straight line or following a first predefined curve from a first one of the edge input values combinations to a provided target, such as the previously determined center point, and from the provided target, e.g., the center point, in a straight line or following a second predefined curve to a second, for example, adjacent edge input values combination. The first and second edge-input values combination may be determined in each case by two successive points of intersection of the input data trajectory with convex envelope H or by adjacent points of intersection of the input data trajectory on convex envelope H with the convex envelope.

Figure 3:
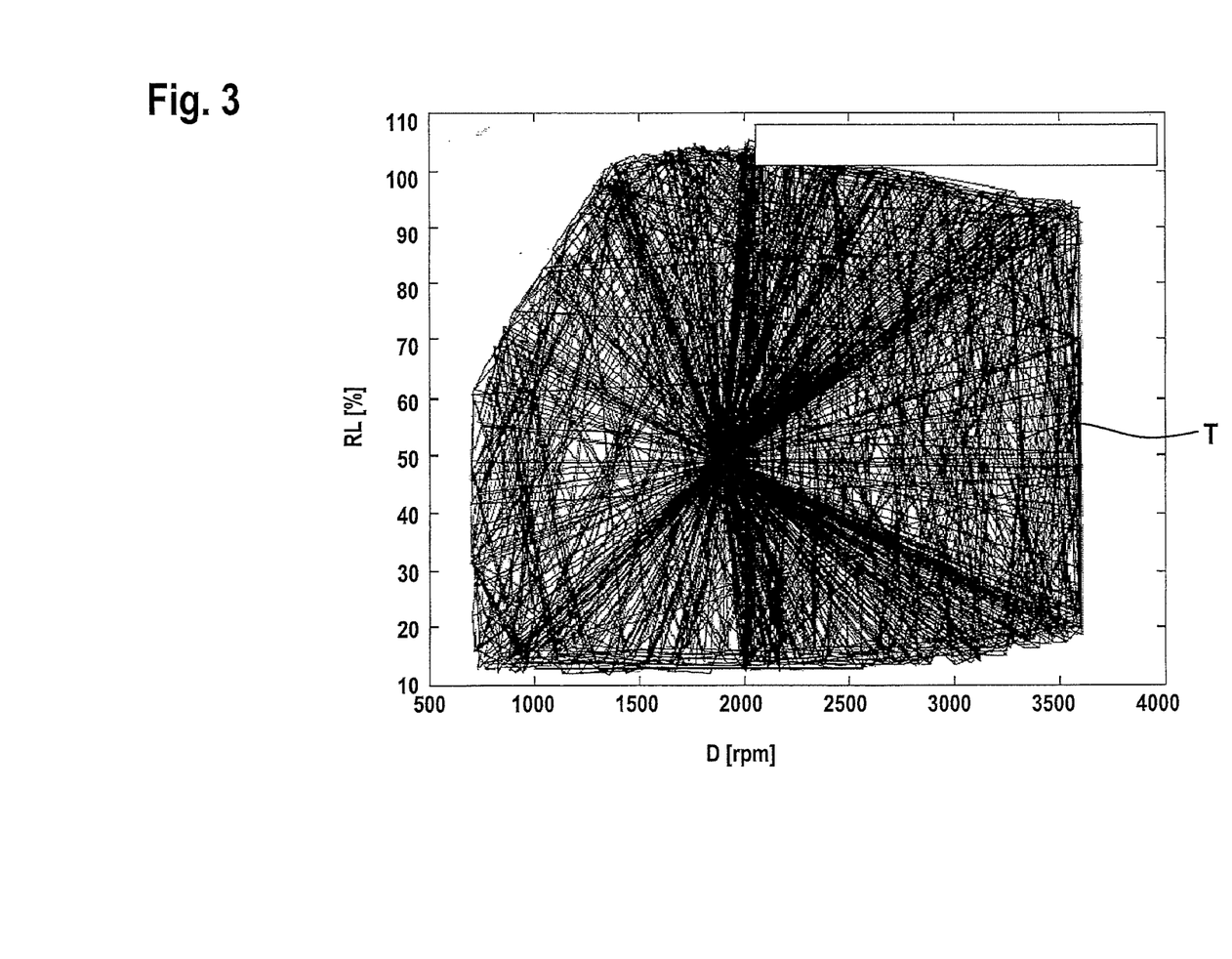
FIG. 3 shows a diagram of input trajectories within an allowed operating range, which were ascertained by transformation of input values combinations outside the allowed operating range according to a first method.

The input data trajectory limited according to the above-described first method to the allowable operating range is shown, for example, in FIG. 3. FIG. 3 shows an allowed input data trajectory T within the allowed operating range shown in FIG. 2b. It is apparent that an input data trajectory runs from the edge area of the allowed operating range at approximately 2,000 revolutions per minute and 50% relative air quantity to the center point (provided target).

According to a second method, the transformation may be carried out as follows. A transformation is carried out for all input values combinations on provided input data trajectory E. The transformation places the input values combinations located outside the allowed operating range on an operating point or measuring point within the allowed operating range.

Figure 4:
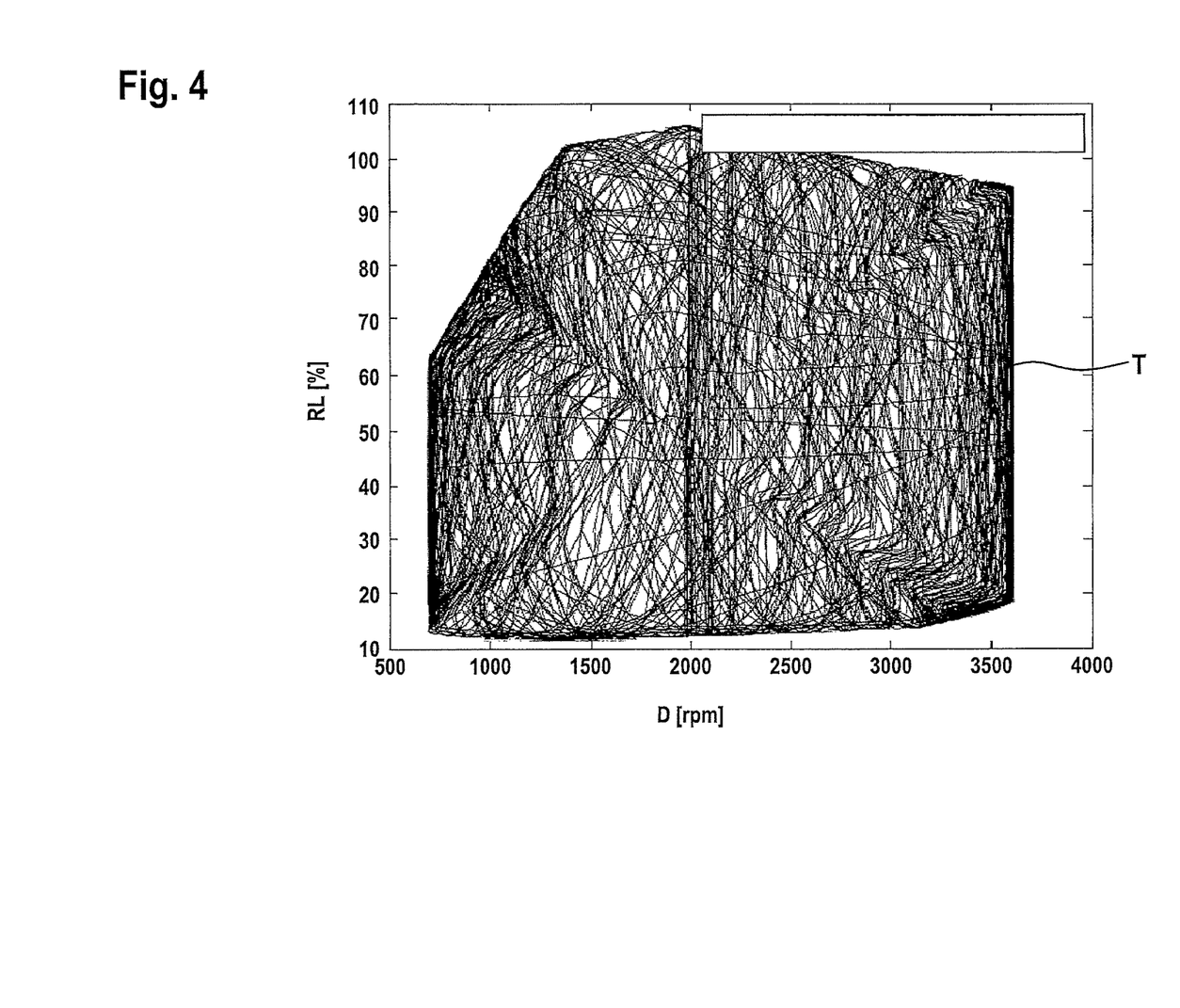
FIG. 4 shows a diagram of input trajectories within an allowed operating range, which were ascertained by transformation of input values combinations outside the allowed operating range according to a second method.

The transformation contains a calculation of the mean value, as described above in connection with the first method, or a provision of a target which is used as a reference value. The position of the transformed input values combinations is ascertained by ascertaining the distance of the input values combinations to be transformed from the provided target, in particular the center point. The transformed input values combination corresponds to a measuring point on the connecting straight line between the center point and the input values combination to be transformed, the position of the transformed measuring point being determined by a distance of the input values combination to be transformed on the connecting straight line subjected to multiplication using a scaling factor r. Scaling factor r corresponds to a ratio of a distance between the center point and the point of intersection of the connecting straight line with the edge of the allowed operating range (convex envelope H) and the distance between the center point and the point of intersection of the connecting straight line with the edge of the original input data space. The result of such a transformation of a provided input data trajectory into the allowed operating range is shown in FIG. 4.

What is claimed is:

1. A method for generating an allowed input data trajectory for an engine system to be tested or measured, the method comprising:
   providing an input data trajectory in an input data space having dimensions corresponding to a number of input variables of the engine system, wherein the input data trajectory is a curve formed by a sequence of combinations of input values of the input variables, the input values being automatically generated for testing or measuring the engine system, each of the combinations of input values of the input variables having a corresponding excitation of the engine system when applied to the engine system;
   determining an allowed operating range for the combinations of the input values of the input variables for testing or measuring the engine system;
   replacing at least one segment of the provided input data trajectory, which is outside of the allowed operating range, with a trajectory segment formed of other combinations of input values of the input variables to obtain the allowed input data trajectory, the other combinations of the input values of the input variables being within the allowed operating range; and
   exciting the engine system to test or measuring the engine system using the allowed input data trajectory, each of the combinations and other combinations of the input values of the input variables of the allowed input data trajectory being applied to the engine system in sequence to obtain a dynamic excitation of the engine system at different operating points of the engine system.

2. The method as recited in claim 1, wherein the sequence of the combinations of the input values of the input variables forming the input data trajectory are uniformly distributed within the input data space.

3. The method as recited in claim 2, wherein the allowed operating range is determined as a convex envelope around allowed input values combinations.

4. The method as recited in claim 3, wherein the allowed input values combinations are determined in that the combinations are recognized as allowed by an application taking place in a stationary measurement of input values combinations selected from the input data space, a stable operating point of the physical system being assumed in the input values combinations.

5. The method as recited in claim 1, wherein the segment of the provided input data trajectory which is outside of the allowed operating range is replaced by a trajectory segment of a first edge-input values combination as a first point of intersection of the input data trajectory with an edge of the allowed operating range to a provided target to a second-edge input values combination as a second point of intersection of the input data trajectory with the edge of the allowed operating point.

6. The method as recited in claim 5, wherein the first edge-input values combination and the second edge-input values combination are adjacent to one another on the edge of the allowed operating range.

7. The method as recited in claim 5, wherein the first edge-input values combination and the second edge-input values combination are determined by two consecutive points of intersection of the provided input data trajectory with the edge of the allowed operating range.

8. The method as recited in claim 1, wherein the provided input data trajectory is transformed into the allowed operating range, in that the distances of the input values combinations on the input data trajectory are reduced from a provided target in the allowed operating range, in conformity with a scaling factor.

9. The method as recited in claim 8, wherein the scaling factor for an input values combination is ascertained as a ratio of a distance between the point of intersection of the connecting straight line with the edge of the allowed operating range and the a center point of the allowed operating range, to the distance between the point of intersection of a connecting straight line elongated to the edge of the input data space with the edge of the input data space and the center point of the allowed operating range.

10. A device for generating an allowed input data trajectory for an engine system to be tested or measured, comprising:
an electronic control unit, including a non-transitory computer-readable storage medium storing a computer program, which is executable by a processor, including:
a program code arrangement having program code for generating an allowed input data trajectory for an engine system to be tested or measured, by performing the following:
providing an input data trajectory in an input data space having dimensions corresponding to a number of input variables of the engine system, wherein the input data trajectory is a curve formed by a sequence of combinations of input values of the input variables, the input values being automatically generated for testing or measuring the engine system, each of the combinations of input values of the input variables having a corresponding excitation of the engine system when applied to the engine system;
determining an allowed operating range for the combinations of the input values of the input variables for testing or measuring the engine system;
replacing at least one segment of the provided input data trajectory, which is outside of the allowed operating range, with a trajectory segment formed of other combinations of input values for the input variables to obtain the allowed input data trajectory, the other combinations of the input values of the input variables being within the allowed operating range; and
exciting the engine system to test or measuring the engine system using the allowed input data trajectory, each of the combinations and other combinations of the input values of the input variables of the allowed input data trajectory being applied to the engine system in sequence to obtain a dynamic excitation of the engine system at different operating points of the engine system.

11. A non-transitory computer-readable storage medium storing a computer program, which is executable by a processor, comprising:
a program code arrangement having program code for generating an allowed input data trajectory for an engine system to be tested or measured, by performing the following:
providing an input data trajectory in an input data space having dimensions corresponding to a number of input variables of the engine system, wherein the input data trajectory is a curve fomed by a sequence of combinations of input values of the input variables, the input values being automatically generated for testing or measuring the engine system, each of the combination of input values of the input variables having a corresponding excitation of the engine system when applied to the engine system;
determining an allowed operating range for the combinations of the input values of the input variables for testing or measuring the engine system;
replacing at least one segment of the provided input data trajectory, which is outside of the allowed operating range, with a trajectory segment formed of other combinations of input values of the input variables obtain the allowed input data trajectory, the other combinations of the input values of the input variables eing within the allowed operating range; and
exciting the engine system to test or measuring the engine system using the allowed input data trajectory, each of the combinations and other combinations of the input values of the input variables of the allowed input data trajectory being applied to the engine system in sequence to obtain a dynamic excitation of the engine system at different operating points of the engine system.

12. An electronic control unit, comprising:
a non-transitory computer-readable storage medium storing a computer program, which is executable by a processor, including:
a program code arrangement having program code for generating an allowed input data trajectory for an engine system to be tested or measured, by performing the following:
providing an input data trajectory in an input data space having dimensions corresponding to a number of input variables of the engine system, wherein the input data trajectory is a curve formed by a sequence of combinations of input values of the input variables, the input values being automatically generated for testing or measuring the engine system, each of the combination of input values of the input variables having a corresponding excitation of the engine system when applied to the engine system;

determining an allowed operating range for the combinations of the input values of the input variables for testing or measuring the engine system;

replacing at least one segment of the provided input data trajectory, which is outside of the allowed operating range, with a trajectory segment formed of other combinations of input values of the input variables to obtain the allowed input data trajectory, the other combinations of the input values of the input variables eing within the allowed operating range; and exciting the engine system to test or measuring the engine system using the allowed input data trajectory, each of the combinations and other combinations of the input values of the input variables of the allowed input data trajectory being applied to the engine system in sequence to obtain a dynamic excitation of the engine system at different operating points of the engine system.

* * * * *